(12) United States Patent
Galford et al.

(10) Patent No.: US 8,044,342 B2
(45) Date of Patent: Oct. 25, 2011

(54) METHOD AND SYSTEM FOR CALCULATING EXTENT OF A FORMATION TREATMENT MATERIAL IN A FORMATION

(75) Inventors: James E. Galford, Missouri City, TX (US); Larry A. Jacobson, Richmond, TX (US); Jerome A. Truax, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 371 days.

(21) Appl. No.: 12/397,506

(22) Filed: Mar. 4, 2009

(65) Prior Publication Data

US 2010/0224773 A1    Sep. 9, 2010

(51) Int. Cl.
 *G01V 5/10* (2006.01)
(52) U.S. Cl. .................................... 250/269.6
(58) Field of Classification Search .............. 250/260, 250/269.6, 269.7
 See application file for complete search history.

(56) References Cited

U.S. PATENT DOCUMENTS

| | | |
|---|---|---|
| 3,739,171 A | 6/1973 | Scott |
| 4,507,553 A | 3/1985 | Oliver |
| 4,585,939 A | 4/1986 | Arnold |
| 4,825,073 A | 4/1989 | Smith et al. |
| 4,883,956 A | 11/1989 | Melcher |
| 5,322,126 A | 6/1994 | Scott, III |
| 5,404,010 A | 4/1995 | Anderson |
| 5,410,152 A | 4/1995 | Gadeken |
| 5,442,173 A | 8/1995 | Wraight |
| 2006/0033023 A1 | 2/2006 | Pemper |
| 2007/0034373 A1 | 2/2007 | McDaniel |

FOREIGN PATENT DOCUMENTS

| | | |
|---|---|---|
| EP | 387 055 A3 | 8/1990 |
| WO | 2007/019585 A2 | 2/2007 |

OTHER PUBLICATIONS

R.R. McDaniel, and J.F, Borges, S.S. Dakshindas, SPE 109969,—Entitled "A New Environmentally Acceptable Technique for Determination of Propped Fracture Height and Width"—Nov. 11-14, 2007—Anaheim, CA.

(Continued)

*Primary Examiner* — Mark R Gaworecki
(74) *Attorney, Agent, or Firm* — Mark E. Scott; Conley Rose, P.C.

(57) ABSTRACT

A method and system for calculating extent of a formation treatment material in a formation. At least some of the illustrative embodiments are methods comprising releasing neutrons into a formation from a neutron source of a logging tool within a borehole having an axis, sensing energies of gammas produced by materials in the formation, the sensing by a gamma detector on the logging tool, generating a measured spectrum of the energies of the gammas sensed by the gamma detector, determining elemental concentrations of materials in the formation based on a basis spectrum, and calculating axial extent of a formation treatment material in the formation in relation to the axis of the borehole based on the elemental concentrations of at least some materials in the formation.

26 Claims, 5 Drawing Sheets

OTHER PUBLICATIONS

S.A. Holditch, D.L. Holcomb, and Zillur Rahim, SPE 26922—Entitled "Using Tracers to Evaluate Propped Fracture Width"—Nov. 2-4, 1993—Pittsburgh, PA.

S.E. Abernathy, S.E. Woods, and J.L. Taylor, III, SPE 27236—Entitled "Radioactive Tracers in Oil and Gas Production; Practical Considerations in the 1990's"—Jan. 25-27, 1994—Indonesia.

L.L. Gadeken, H.D. Smith, R.—Entitled "Tracerscan—A Spectroscopy Technique for Determining the Distribution of Multiple Radioactive Tracers in Downhole Operations"; SPWLA Twenty-Seventh Annual Logging Symposium—Jun. 9-13, 1986—Houston, TX.

PCT Search Report and Written Opinion for PCT Patent Application No. PCT/US2010/024231 filed Feb. 15, 2010.

METHOD AND SYSTEM FOR CALCULATING EXTENT OF A FORMATION TREATMENT MATERIAL IN A FORMATION

BACKGROUND

In order to increase the production of hydrocarbons (e.g., oil and gas) from formations, various fracturing techniques may be used. For example, in "hydraulic fracturing" a fracturing fluid is forced, under high pressure, down a cased, perforated borehole. The fracturing fluid enters the formation surrounding the borehole and creates and/or opens fractures within the formation. In some cases, a "proppant" is included with the fracturing fluid. When the pressure of the fracturing fluid is released, and the proppants remain in the fractures of the formation to keep the fractures propped open.

It is desirable to know the extent that fracturing has occurred within a formation, particularly the "vertical" extent of the fracturing (i.e., the distance in relation to the axis of the borehole). While tools exist to estimate the extent of the fracturing, any technique that can more accurately determine the extent of the fracturing provides a competitive advantage.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean photon energy created and/or released due to neutron interaction with atoms, and in particular atomic nuclei, and shall include such energy whether such energy is considered a particle (i.e., gamma particle) or a wave (i.e., gamma ray or wave).

"Spectrum" shall mean the expected and/or measured counts of gammas having particular energy or energies, the gammas created by decay of a single type of radioactive element.

"Basis matrix" shall mean a plurality of spectra, for example, one spectrum for each type of radioactive element within an earth formation.

"Measured spectrum" shall mean, for a particular gamma detector, a plurality of count values of energies of gammas, each count value based on gammas counted having energies within a particular energy range or window.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of wireline logging tools measuring the extent of fracturing caused by a fracturing (or "frac") operation, and thus the description that follows is based on the developmental context; however, the various systems and methods find application not only in wireline logging tools regardless of the number of cables used in the logging tools, but may also find application in measuring-while-drilling (MWD), logging-while-drilling tools (LWD), and slickline (memory) logging. Thus, the developmental context shall not be construed as a limitation as to the applicability of the various embodiments.

Figures 1, 7:
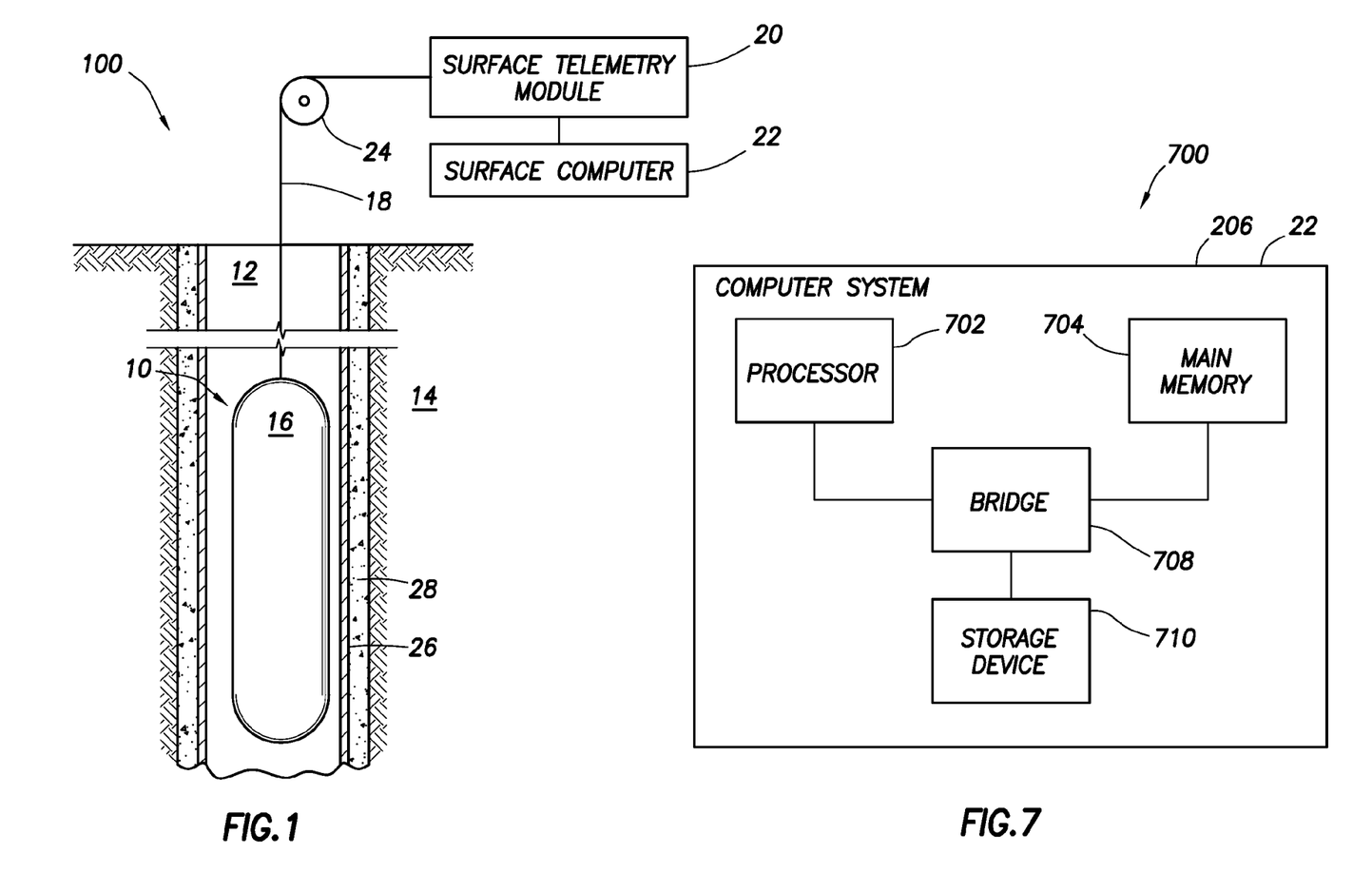
FIG. 1 shows a logging system in accordance with some embodiments.
FIG. 7 shows a computer system in accordance with at least some embodiments.

FIG. 1 illustrates a logging system 100 constructed in accordance with a least some embodiments. In particular, system 100 comprises a logging tool 10 placed within a borehole 12 proximate to a formation 14 of interest. The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). The borehole 12 may comprise a casing 26 with cement 28 between the casing 26 and the borehole wall.

Figure 2:
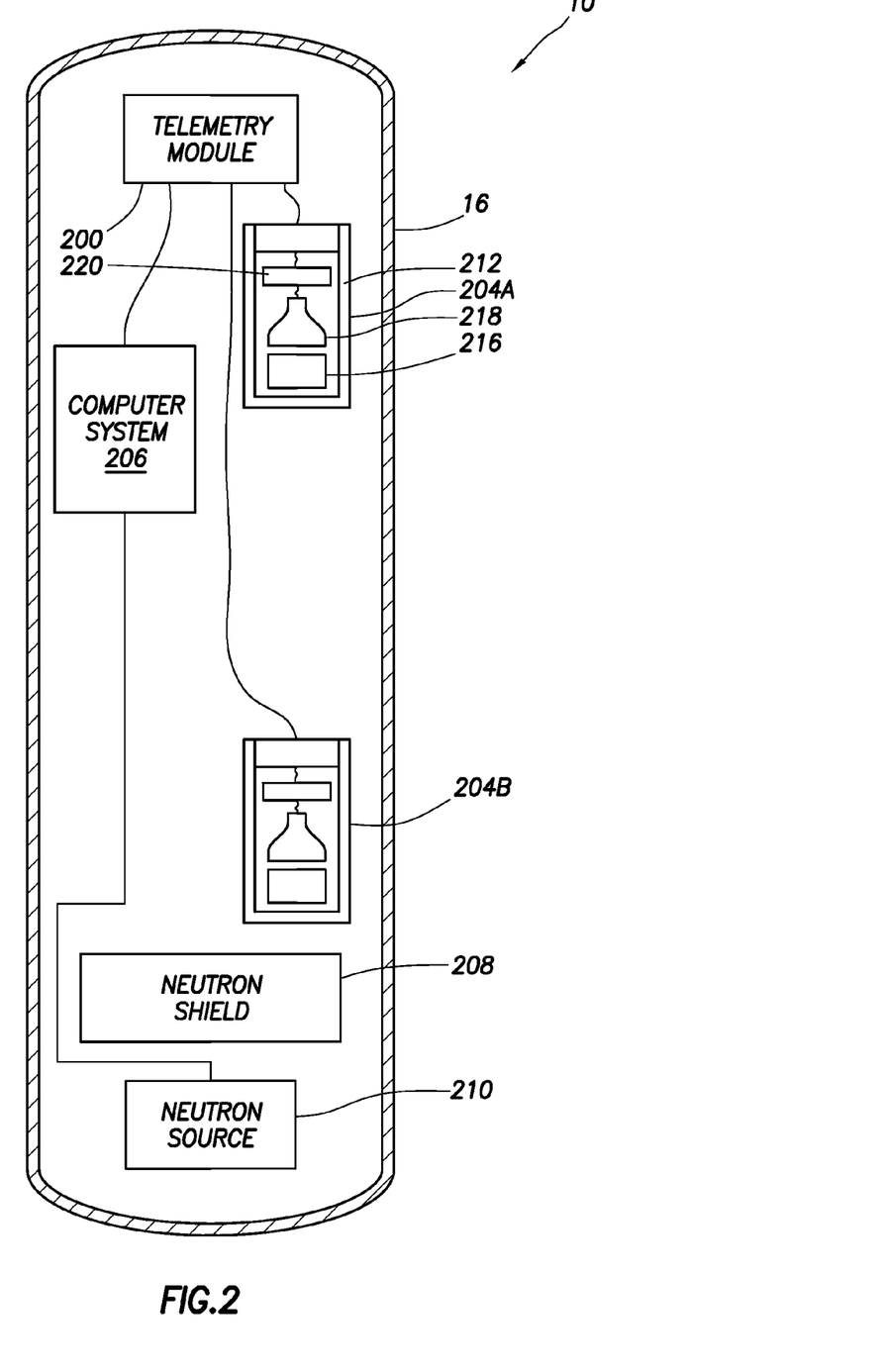
FIG. 2 shows a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, one or more gamma detectors 204 (in this illustrative case two gamma detectors labeled 204A and 204B), computer system 206, a neutron shield 208 and a neutron source 210. While the gamma detectors 204 are shown above the neutron source 210, in other embodiments the gamma detectors may be below the neutron source. Gamma detector 204B may be on the order of 6 feet from the neutron source. Gamma detector 204A may be on the order of 18 feet from the neutron source 210. Other spacing may be equivalently used.

In some embodiments the neutron source 210 is an Americium-Beryllium (AmBe) source, which release neutrons having average energies of about 4 Mega-electron Volts (MeV). However, any neutron source capable of producing and/or releasing neutrons with sufficient energy (e.g., a deuterium/ tritium source, or a Californium (Cf) source) may be equivalently used. An AmBe source and Cf source release neutrons at all times (i.e., neutron release is not controllable). In cases where release of neutrons from the neutron source is controllable, under command from surface computer 22 or computer system 206 the tool may selectively produce and/or release the energetic neutrons. In order to reduce the irradiation of the gamma detectors 204 and other devices by energetic neutrons from the neutron source 210, neutron shield 208 (e.g., HEVIMET® available from General Electric Company of Fairfield, Conn.) may be disposed between the neutron source 210 from the gamma detectors 204.

Because of the speed of the energetic neutrons, and because of collisions of the neutrons with atomic nuclei that change the direction of movement of the neutrons, a neutron flux is created around the logging tool 10 that extends into the formation 14. The interactions of the neutrons with materials in the borehole and in the formation 14 produce gammas. Some gammas are created by way of inelastic collisions and/or thermal capture that result in prompt gamma production. Gammas created by way of inelastic collision and/or thermal capture that result in prompt gamma production are not of interest in the various embodiments. However, the interaction of the neutrons with the materials in the formation may also make some otherwise non-radioactive materials radioactive, with the newly radioactive elements decaying with particular half lives by release of gammas. The energy of the gamma resulting from the decay is indicative of the material from which the gamma is released. Moreover, other materials in the formation (e.g., Potassium, Uranium and Thorium), while not made radioactive by the neutron interaction, are nonetheless radioactive, and these naturally radioactive materials also decay, with particular half lives, by producing gammas.

At least some of the gammas created by radioactive decay of various materials are incident upon the gamma detectors 204. Referring to gamma detector 204A as indicative of both gamma detectors 204, a gamma detector comprises an enclosure 212, and within the enclosure 212 resides; a crystal 216 (e.g., scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200, or to the computer system 206 within the tool.

Figure 3:
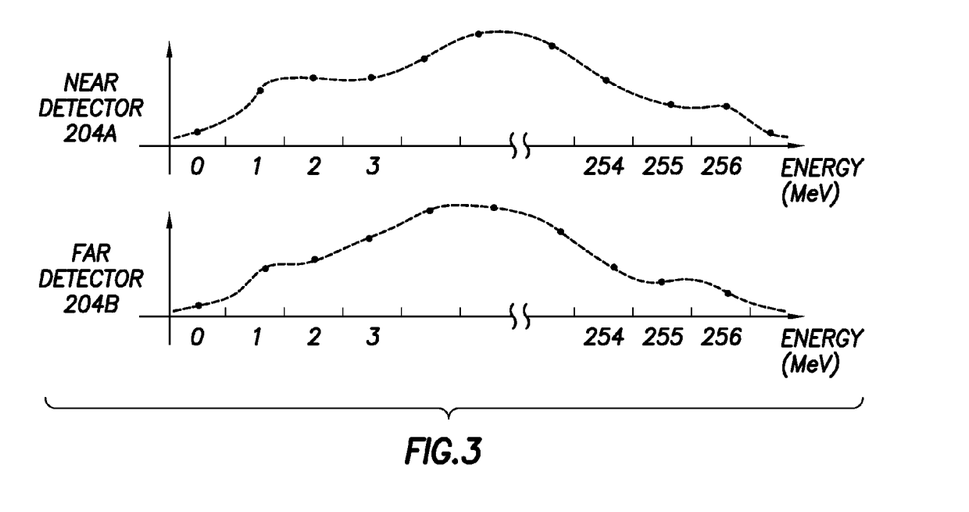
FIG. 3 shows a graph of energies sensed in accordance with at least some embodiments.

FIG. 3 shows a plurality of graphs as a function of gamma energy in order to describe how the gamma arrivals are recorded and characterized in accordance with at least some embodiments. In particular, FIG. 3 shows gamma count values for the near detector 204A and the far detector 204B versus energy. In accordance with the various embodiments, a single interrogation (i.e., at a particular borehole depth) comprises activating materials within the formation with the neutron source, and after the inelastic and prompt gamma production dies away, detecting energy of gamma produced by radioactive decay by at least one of the detectors 204 for a predetermined amount of time (e.g., the time to traverse 0.25 feet). With respect to counting gamma arrivals with particular energies, the X-axis of the graph is divided into a plurality of energy windows or energy bins. With reference to the graph for the near detector 204A as illustrative of both gamma detectors, in some embodiments the X-axis is divided into 256 total energy windows or energy bins spanning 0 MeV to about 3 MeV. Each gamma that arrives with energy in one of the energy bins increases the count value of gammas within that energy bin. The count values within each energy bin (for a particular borehole depth) are recorded either by way of the surface computer 22 or by the computer system 206 within the tool.

Illustrative count values for each energy bin are shown in FIG. 3 as dots in the center of each energy bin. The count value for each energy bin is represented by the height of the dot above the X-axis (i.e., the Y-axis value). Taking all the count values for a particular detector together, the dots may be connected by an imaginary line (shown in dashed form in FIG. 3) to form a mathematical curve illustrative of the number of gamma arrivals as a function of energy detected by the particular gamma detector. In accordance with the various embodiments, the plurality of count values is referred to as a measured spectrum.

Figure 4:
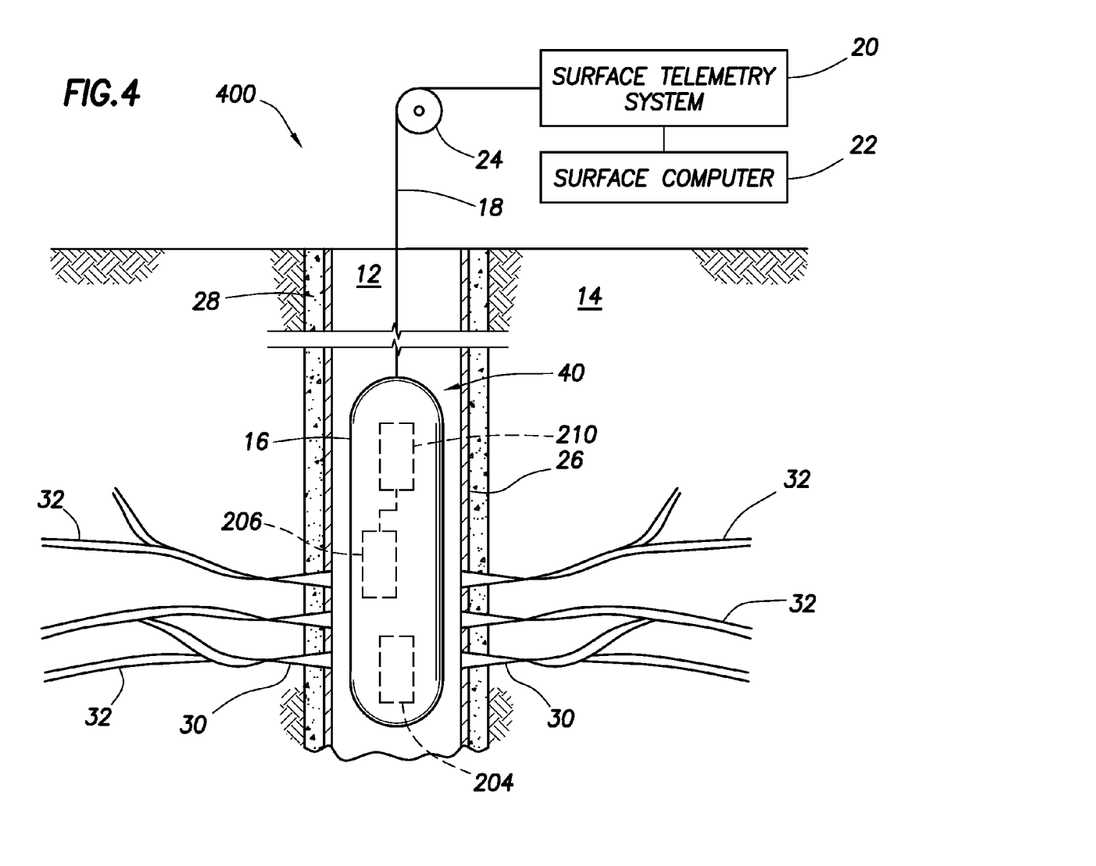
FIG. 4 shows a logging system in accordance with at least some embodiments.

FIG. 4 illustrates the logging system 400 similar to the embodiments of FIGS. 1 and 2, but having a single gamma detector 204. In particular, the logging system 400 shows the well casing 24 and the cement 28 are perforated 30. Fracturing techniques utilizing various formation treatment materials, such as a fracturing fluid, an acidizing fluid or a proppant, are used to create and/or increase the size of the fractures 32 in the formation 14. For example, fracturing fluids may be injected into the formation 14 at high pressures to fracture open the formation 14, acids used to increase the size of the fractures, and/or proppants carried with the fracturing fluids into the fractures 32 keep the fractures 32 propped open.

During the fracturing process, the fractures may propagate throughout the formation. For example, if not carefully controlled, a fracture may extend beyond a zone of interest into zones that are not productive. If the fracture extends into non-productive zones (e.g., water bearing zones), adverse economic consequences may result. Thus, the various embodiments are related to logging systems that are used to ensure that the fractures do not extend beyond the zone of interest.

In accordance with various embodiments, the logging system 400 determines in the axial extent (i.e., the distance in relation to the axis of the borehole) of travel of the formation treatment materials used to create the fractures 32. In particular, system 400 comprises a logging tool 40 comprising a pressure vessel 16 that houses a neutron source 210, a gamma detector 204, and in some embodiments a computer system 206. The gamma detector 204 may be on the order of 6 feet from the neutron source 210; however, other spacing may be equivalently used. In the particular embodiment, the logging tool 20 is initially lowered into the borehole 12 by way of the cable 18 before the formation 14 is fractured. Because the neutron source 210 of the logging tool 50 is above the gamma detector 204, logging initially occurs during downward travel of the logging tool 50. Because of the distance between the source 210 and the detector 204, and the logging speed, the single gamma detector 204 of these embodiments senses gammas produced only by naturally radioactive materials present in the formation 14. In alternative embodiments, logging may occur during upward travel if the neutron source is below the gamma detector. The surface computer 22 (or the computer system 206) generates a measured spectrum of the energies of the gammas sensed. The measured spectrum is analyzed with a basis matrix to determine background elemental concentrations of the naturally radioactive materials present in the formation (e.g., Potassium, Uranium and Thorium).

In some embodiment, the background elemental concentrations of the naturally radioactive materials present in the formation 14 may be determined by a spectral fitting technique, such as a weighted least squares technique. The surface computer 22 (or the computer system 206) uses the weighted least squares technique to determine the elemental concentrations of the materials in the formation 14 based on the following equation:

$$[C]=[A]\cdot[M] \quad (1)$$

where [C] is the measured spectrum of the energies of the gammas sensed by the detector, [A] is a basis matrix, and [A] is the elemental concentrations of the materials in the formation. In some embodiments, [C] is a i-by-1 matrix that represents the measured spectrum of the energies of the gammas sensed by the detector, [A] is a i-by-j matrix of the elemental spectra, and [A] is a j-by-1 matrix of the elemental concentrations of the materials in the formation. In the particular embodiment, i is the number channels the spectrum is divided into (see FIG. 3), and j is the number of materials in the formation for which the elemental concentrations are to be determined. In some embodiments, the basis matrix is empirically developed based on materials known to be in formation 14. Stated otherwise, the basis matrix consists of all the naturally radioactive elemental spectra that would be expected in the formation 16.

In the particular embodiment of FIG. 4, to determine the background elemental concentrations of naturally radioactive materials present (e.g., Potassium, Uranium and Thorium) the basis matrix $[A]_b$ is a combination of spectra of Potassium, Uranium and Thorium. The surface computer 22 (or the computer system 206) analyzes (e.g., using the weighted least squares technique) the measured spectrum of the energies sensed by the gamma detector 204 $[C]_b$ with the basis spectrum $[A]_b$ to determine $[A]_b$ in equation (1), the background elemental concentrations of Potassium, Uranium and Thorium. In some embodiments, the background elemental concentrations of naturally radioactive materials present are determined at predetermined intervals (i.e., at a plurality of particular borehole depths), and the background elemental concentrations are stored in a memory of a computer, for example the surface computer 22 (or the computer system 206) with the corresponding borehole depth.

After the logging tool 40 has read the spectrum for the naturally occurring radioactive materials, the logging tool 40 is either lowered to a particular borehole depth or removed. Whether lowered to a particular borehole depth or removed, thereafter, the formation 14 is fractured using a fracturing technique. In particular, the fracturing technique uses formation treatment materials (e.g., a fracturing fluid, an acidizing fluid or a proppant) comprising radiation activated materials. The radiation activated materials are initially inactive (i.e., non-radioactive), but when the radiation activated materials interact with the neutron released by the neutron source 210, the radiation activated materials will become radioactive and produce gammas.

In alternative embodiments, the formation 14 is fractured with radiation activated materials in the treatment materials prior to lowering the logging tool 40 to determine the background elemental concentrations of naturally radioactive materials present in the formation 14. Thus, the logging tool 40, by logging away from the neutron source 210, may be used to determine the background elemental concentrations of naturally radioactive materials present in the formation 14 after the fracturing.

In particular embodiment of FIG. 4, the radiation activated material may be any material that is capable of being activated by the neutron source 210, and has a decay time in the range of 1 minute to 100 minutes. For example, the radiation activated material present in the formation treatment materials may be Vanadium. Vanadium is a radiation activated material with a half life of approximately 3.8 minutes, and the decay of Vanadium produces gammas with energies of approximately 1.43 MeV. In the embodiments of FIG. 4, neutron source 210 may be a Cf neutron source which continuously releases neutrons into the formation.

After the formation 14 is fractured using formation treatment materials comprising radiation activated materials, the logging tool 40 is raised at a predetermined rate (e.g., 5 feet per minute) by way of the cable 18. The neutrons interact with materials in the formation 14 and the materials in the formation produce gammas whose energies are sensed by the gamma detector 204. Because the logging tool 40 is raised at a slow speed (e.g., 5 feet per minute), by the time the detector 204 arrives at a particular borehole depth previously passed by the neutron source, the prompt gamma production has substantially died away, and the single gamma detector 204 of these embodiments senses gammas produced by naturally radioactive materials present in the formation 14 and gammas produced by materials made radioactive by the neutron radiation. In some embodiments, the surface computer 22 (or the computer system 206) generates a measured spectrum of the energies of the gammas sensed. The measured spectrum is analyzed with the background elemental concentrations using a spectral fitting technique to determine elemental concentration of radiation activated materials, and the axial extent (i.e., the distance in relation to the axis of the borehole) the formation treatment materials with radiation activated materials have migrated within the formation is determined based on the elemental concentration of radiation activated materials.

In the particular embodiment of FIG. 4, using the measured spectrum and the background elemental concentrations $[A]_b$, the concentrations of radiation activated material in the formation are determined using weighted least squares technique and equation (1). At a particular borehole depth, the basis matrix $[A]_v$ in equation (1) is a combination of the spectra of Potassium, Uranium and Thorium and spectra of the radiation activated material. The surface computer 22 (or the computer system 206) analyzes (e.g., using the weighted least squares technique) the measured spectrum of the energies sensed by the gamma detector 204 $[C]_b$ with the basis spectrum $[A]_b$, to determine $[M]_v$ (i.e., elemental concentration of Potassium, Uranium, Thorium and Vanadium) in equation (1). In this case, the background elemental concentrations of Potassium, Uranium and Thorium $[M]_b$ was previously determined at the particular depth and thus the elemental concentrations of Potassium, Uranium and Thorium in $[M]_v$ are constrained. Only the elemental concentration of radiation activated material in $[M]_v$ is modified during each iteration of weighted least squares technique until the elemental concentration of radiation activated material is determined. Based on the basis matrix $[A]_v$ for a plurality of borehole depths, the surface computer 22 (or the computer system 206) calculates the axial extent (i.e., in relation to the axis of the borehole 12) of the formation treatment materials with radiation activated materials used to create the fractures 32 in the formation 14.

In alternative embodiments, during the first pass the surface computer 22 (or the computer system 206) generates (at plurality of borehole depths) the measured spectrum $[C]_b$ of the energies of the gammas produced by naturally radioactive materials in formation 14, and the measured spectrum $[C]_b$ is stored in a memory of the surface computer 22 (or the computer system 206) with the corresponding borehole depth. Thereafter, during the second pass of the logging tool 40 the surface computer 22 (or the computer system 206) generates (at the plurality of the borehole depths) the measured spectrum $[C]_v$. The surface computer 22 (or the computer system 206) access the measured spectrum $[C]_b$ from the memory and simultaneously analyzes measured spectrums $[C]_b$ and $[C]_v$ (e.g., using the weighted least squares technique and equation (1)) to determine the axial extent of the formation treatment materials with radiation activated materials in the formation 14.

Figure 5:
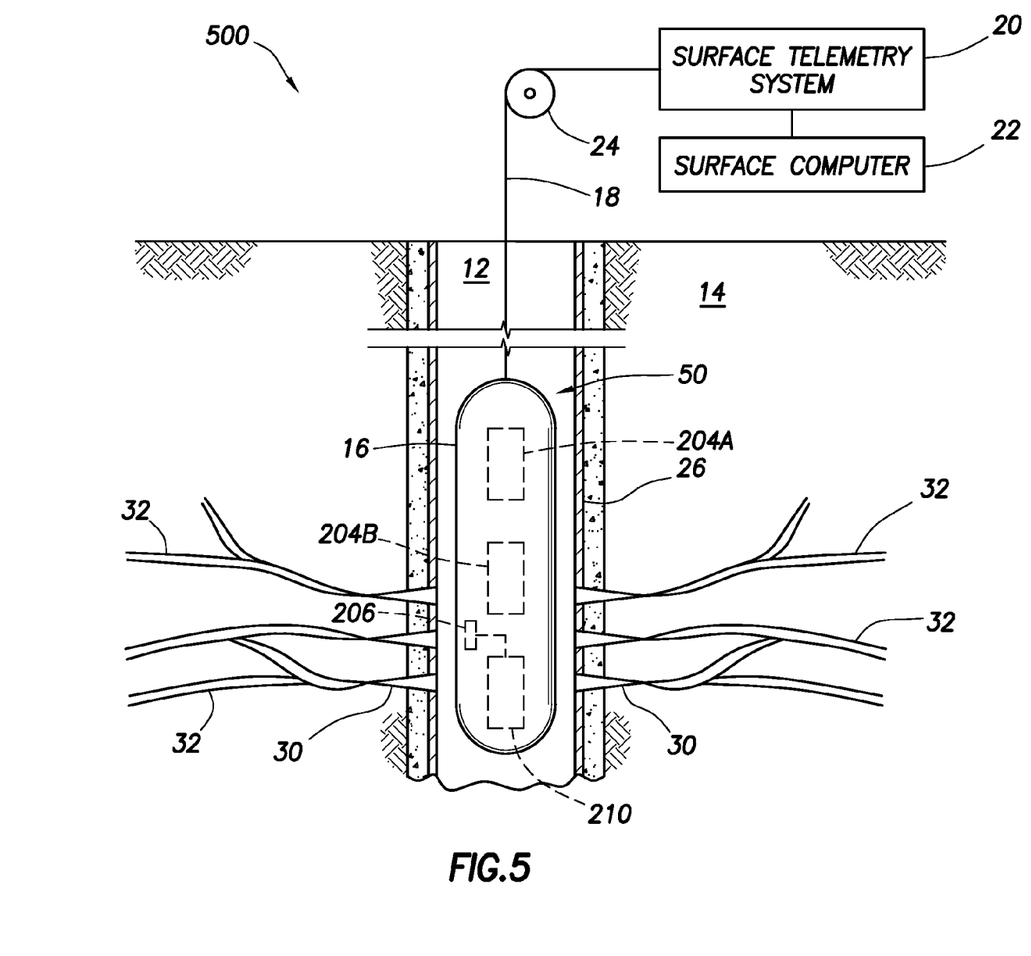
FIG. 5 shows a logging system in accordance with at least some embodiments.

FIG. 5 illustrates a logging system 500 similar to the embodiments of FIGS. 1 and 2 having two gamma detectors 204. In particular, FIG. 5 illustrates a cased borehole 12 that is perforated 30. The logging system 500 also comprises a logging tool 50 comprising a vessel that houses a neutron source 210, a "near" gamma detector 204B, and a "far" gamma detector 204A. The "near" gamma detector 204B may be relatively close (e.g., 6 feet) to the neutron source 210, and "far" gamma detector 28 may be spaced away (e.g., 18 feet) from the neutron source 210. In the particular embodiment of FIG. 5, the neutron source 24 is below the gamma detectors 204; however, in alternative embodiments, the neutron source 210 may be above the gamma detectors 204.

In some embodiments, the logging system 500 may determine, in real-time and in a single pass through the borehole 12, the axial extent of the formation treatment materials with radiation activated materials used to create the fractures 32. Because the neutron source 210 of the logging tool 50 is below the gamma detectors 204, logging occurs during downward travel of the logging tool 50 at a predetermined rate (e.g., 5 feet per minute). As the logging tool 50 is lowered in the borehole 12, the neutron source 210 (e.g., a Cf source) continuously releases neutrons into the formation. The neutrons interact with materials in the formation 14 and the materials in the formation produce gammas whose energies are sensed by the detectors 204. The materials in the formation 14 comprise naturally radioactive materials present (e.g., Potassium, Uranium and Thorium) in the formation 14, and radiation activated material in the formation as delivered by the formation treatment materials.

Like the embodiments of FIG. 4, the embodiments of FIG. 5, are concerned with gammas produced by naturally radioactive materials present in the formation 14 and radiation activated material. In some embodiments, the radiation activated material (e.g., Vanadium) substantially decays before the "far" gamma detector 204A passes by the radiation activated material because the time difference between when the neutron source 210 and the "far" gamma detector 204A pass a particular borehole depth is approximately one half life or more of the radiation activated material. Thus, the "far" gamma detector 204A senses substantially only the energies of the gammas produced by naturally radioactive materials present in the formation, such as Potassium, Uranium and Thorium.

For a particular borehole depth, the surface computer 22 (or the computer system 206) generates a measured spectrum of the energies of the gammas sensed by the "far" gamma detector 204A, and determines the elemental concentrations of Potassium, Uranium and Thorium using the weighted least squares technique and equation (1). In this case, the basis matrix $[A]_b$ is a combination of spectra of Potassium, Uranium and Thorium. The surface computer 22 (or the computer system 206) analyzes the measured spectrum of the energies sensed by the gamma detector 204A $[C]_f$ with the basis spectrum $[A]_b$ to determine $[M]_b$ in equation (1), the elemental concentrations of Potassium, Uranium and Thorium. In the particular embodiment of FIG. 5, the basis matrix $[A]_b$ may form at least a portion of a basis matrix $[A]_v$ that is utilized along with the measured spectrum of the energies of the gammas sensed by the "near" gamma detector 204B $[C]_n$ to determine the elemental concentration of radiation activated materials at the particular borehole depth.

The "near" gamma detector 204B senses energies of gammas produced by naturally radioactive materials present in the formation (e.g., Potassium, Uranium and Thorium) and radiation activated material. The surface computer 22 (or the computer system 206) generates a measured spectrum $[C]_n$ of the energies of the gammas sensed by the "near" gamma detector 204B. The basis matrix $[A]_v$ is a combination of the spectra of Potassium, Uranium and Thorium, and spectra of radiation activated material. The surface computer 22 (or the computer system 206) analyzes the measured spectrum of the energies sensed by the gamma detector 204B $[C]_n$ with the basis spectrum $[A]_v$ at the particular borehole depth to determine $[M]_v$ (i.e., elemental concentration of radiation activated material) in equation (1). The surface computer 22 (or the computer system 206) uses the weighted least squares technique and constrains the elemental concentrations of Potassium, Uranium and Thorium in $[M]_v$, to determine the elemental concentration of the radiation activated material. The surface computer 22 (or the computer system 206) calculates the axial extent of the formation treatment materials with radiation activated materials in the formation 14 at the particular borehole depth based on the elemental concentration of the radiation activated material. In particular embodiment of FIG. 5, the radiation activated material may be any material that is capable of being activated by the neutron source 210, and has a decay time in the range of 1 minute to 100 minutes. For example, the radiation activated material present in the formation treatment materials may be Vanadium.

The energies of the gammas produced by decay of Potassium and Vanadium are close, approximately 1.46 MeV and 1.43 MeV respectively. Because the Vanadium and Potassium spectra are very similar and cannot be easily distinguished the various embodiments so far are related to determining axial extent by utilizing a logging tool with one gamma detector and two passes through the borehole, and a logging tool with two gamma detectors and one pass through the borehole.

The various embodiments discussed so far are related to creating fractures in the formation using formation treatment materials comprising radiation activated material Vanadium. In alternative embodiments, radiation activated material Indium may equivalently be used in formation treatment materials to create fracture in the formation. Returning to FIG. 4, the logging system 400 may be used to determine, in real-time and in a single pass through the borehole 12, the axial extent of the formation treatment materials with radiation activated material Indium used to create the fractures 32. Because of the spectral uniqueness of Indium the initial pass through the borehole using logging system 400 to determine the background elemental concentrations is not needed. The energies of the gammas produced by decay of Indium, approximately 2.11 MeV, after activation by neutrons is sufficiently distinct from the energies of the gammas produced by the naturally radioactive materials present in the formation (e.g., Potassium, Uranium and Thorium) that the elemental concentration of Indium can be determined with a single reading at a particular borehole depth. The neutron source 210 releases the neutrons into the formation, and the gamma detector 204 senses the gammas produced by the materials (in this case Potassium, Uranium, Thorium and Indium) in the formation. The surface computer 22 (or the computer system 206) generates a measured spectrum of the energies of the gammas sensed by the gamma detector 204, and analyzes the measured spectrum with a basis matrix to determine the elemental concentration of Indium.

In the particular embodiment, the basis matrix [A] is a combination of spectra of Potassium, Uranium, Thorium and Indium. The surface computer 22 (or the computer system 206) analyzes (e.g., using the weighted least squares technique) the measured spectrum of the energies sensed by the gamma detector 204 [C] at the particular borehole depth with the basis spectrum [A] to determine [M] in equation (1), the elemental concentrations of Potassium, Uranium, Thorium and Indium. Because of the spectral uniqueness of Indium, the elemental concentrations of Potassium, Uranium and Thorium in [M] are not constrained. The surface computer 22 (or the computer system 206) calculates the axial extent of the formation treatment materials with radiation activated material Indium in the formation 14 based on the elemental concentration of Indium.

Figure 6:
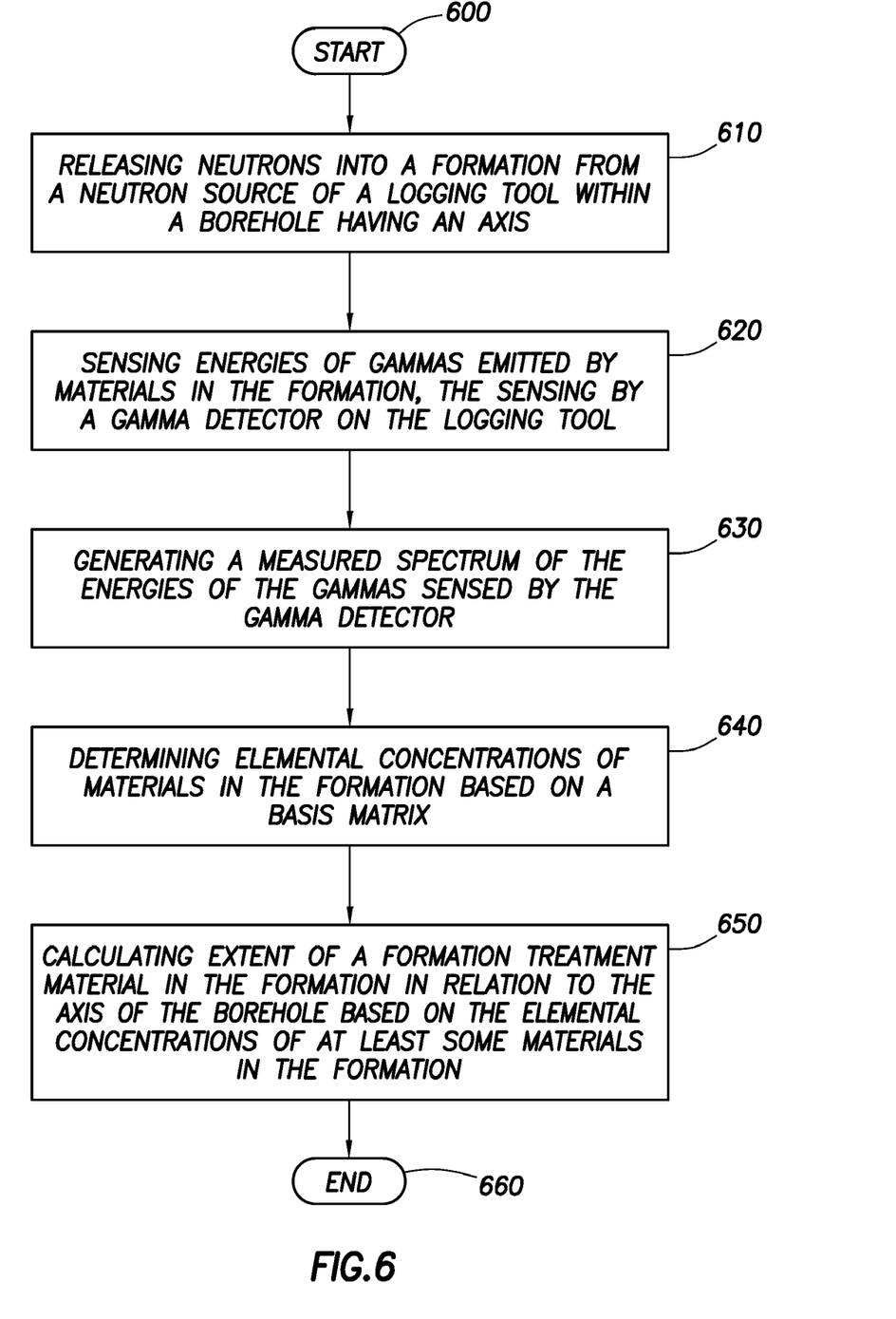
FIG. 6 shows a method in accordance with at least some embodiments.

FIG. 6 shows a method in accordance with at least some embodiments. In particular, the method starts (block 600) and proceeds to releasing neutrons into a formation form a neutron of a logging tool within a borehole having an axis (block 610). Next, a gamma detector on the logging tool senses energies of gammas produced by materials in the formation (block 620). In some embodiments, the materials in the formation comprise naturally radioactive materials present in the formation and radiation activated materials (e.g., Vanadium, or Indium). Thereafter, a measured spectrum of energies of the gammas sensed by the detector is generated (block 630), and elemental concentrations of the materials in the formation is determined based on a basis matrix (block 640). In some embodiments, the elemental concentrations of the materials in the formation are determined by a spectral fitting technique that analyzes the measured spectrum of energies of the gammas with the basis spectrum. Next, the extent of formation treatment materials in the formation in relation to the axis of the borehole is calculated based on the elemental concentrations of at least some materials in the formation (block 650). The method then ends (block 660).

FIG. 7 illustrates in greater detail a computer system 700, which is illustrative of both the surface computer system 22 and the computer system 206 within the logging tool 10, 40 and 50. Thus, the computer system 700 described with respect to FIG. 7 could be proximate to the borehole during the time period during which the logging tool 10, 40 and 50 are within the borehole, the computer system 700 could be located at the central office of the oilfield services company, or the computer system 700 could be within the logging tool 10, 40 and 50 (such as for LWD or MWD tools). The computer system 700 comprises a processor 702, and the processor couples to a main memory 704 by way of a bridge device 708. Moreover, the processor 702 may couple to a long term storage device 710 (e.g., a hard drive) by way of the bridge device 708. Programs executable by the processor 702 may be stored on the storage device 710, and accessed when needed by the processor 702. The program stored on the storage device 710 may comprise programs to implement the various embodiments of the present specification, including programs to implement sensing energies of gammas produced by materials in the formation, determining elemental concentrations of materials in the formation based on a basis spectrum and calculating axial extent of a formation treatment material of the formation based on the elemental concentrations of the materials in the formation. In some cases, the programs are copied from the storage device 710 to the main memory 704, and the programs are executed from the main memory 704.

Thus, both the main memory 704 and storage device 710 are considered computer-readable storage mediums. The axial extent of the formation treatment materials in the formation calculated by the computer system 710 may be sent to a display device which may make a representation of the extent for viewing by a geologist or other person skilled in the art of interpreting such logs.

From the description provided herein, those skilled in the art are readily able to combine software created as described with appropriate computer hardware to create a special purpose computer system and/or special purpose computer sub-components in accordance with the various embodiments, to create a special purpose computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, in the particular embodiment of FIG. 5, if logging tool 50 comprises the neutron source 210 above the detectors 204, then the logging tool 50 is lowered below the fractured formation of interest, and raised at a predetermined rate to determine the axial extent of the formation treatment materials. It is intended that the following claims be interpreted to embrace all such variations and modifications.

What is claimed is:

1. A method comprising:
    releasing neutrons into a formation from a neutron source of a logging tool within a borehole having an axis;
    sensing energies of gammas produced by materials in the formation, the sensing by a gamma detector on the logging tool;
    generating a measured spectrum of the energies of the gammas sensed by the gamma detector;
    determining elemental concentrations of the materials in the formation based on a basis matrix; and
    calculating extent of a formation treatment material in the formation in relation to the axis of the borehole, the calculating based on the elemental concentrations of at least some materials in the formation.

2. The method as defined in claim 1 further comprising repeating the sensing, generating, determining and calculating for a plurality of depths within the borehole.

3. The method as defined in claim 1 wherein calculating further comprises calculating the axial extent of the formation treatment material in the formation based on elemental concentrations of radiation activated material present in the formation treatment material, the formation treatment material is at least one selected from the group consisting of: a proppant; a fracturing fluid; and an acidizing fluid.

4. The method as defined in claim 3 wherein calculating further comprises calculating the axial extent of formation treatment material in the formation based on radiation activated material being at least one selected from the group consisting of: vanadium; and indium.

5. The method as defined in claim 1 wherein generating the spectrum of the energies of the gamma further comprises generating a spectrum of the energies of the gammas from 0 Mega-electron Volt (MeV) to 3 MeV.

6. The method as defined in claim 1 further comprising empirically developing the basis matrix based on radioactive materials known to be in formation.

7. The method as defined in claim 6 wherein the basis matrix comprises a plurality of spectra, where each of the plurality of spectra is a spectrum for a single radioactive material known to be in the formation.

8. The method as defined in claim 1 wherein the determining further comprises spectral fitting the measured spectrum of the energies of the gammas with the basis matrix.

9. A system comprising:
a neutron source that releases neutrons in a formation;
a gamma detector that senses energies of gammas produced by materials in the formation;
a processor electrically coupled to the neutron source and the gamma detector, wherein the processor:
analyzes a measured spectrum of the energies of the gamma against a basis matrix; and based on the analysis
determines elemental concentrations of the materials in the formation; and
calculates an axial extent of a formation treatment material in the formation in relation to an axis of a borehole based on the elemental concentration of at least some materials in the formation.

10. The system as defined in claim 9 wherein the elemental concentrations of the materials in the formation comprises elemental concentrations of naturally radioactive materials present in the formation, and elemental concentrations of radiation activated material present in the formation treatment material.

11. The system as defined in claim 10 wherein the processor determines the axial extent of the formation treatment material in the formation based on the elemental concentrations of the radiation activated material present in the formation treatment material.

12. The system as defined in claim 10 wherein the formation treatment material is at least one selected from the group consisting of: a proppant; a fracing fluid; and an acidizing fluid.

13. The system as defined in claim 10 wherein the radiation activated material is at least one selected from the group consisting of: vanadium; and indium.

14. The system as defined in claim 9 wherein the processor applies spectral fitting techniques to determine the elemental concentrations of the material in the formation.

15. The system as defined in claim 9 wherein the basis matrix is empirically developed based on radioactive materials known to be in the formation.

16. A non-transitory computer-readable storage media storing a program that, when executed by a processor of a logging system, causes the processor to:
obtain a measured spectrum of energies of gammas produced by material in a formation;
analyze the measured spectrum of energies of gamma produced by materials in the formation against a basis matrix;
determine elemental concentrations of the materials in the formation; and
calculate axial extent of a formation treatment material in the formation in relation to an axis of a borehole based on the elemental concentrations of at least some materials in the formation.

17. The computer-readable storage media storing as defined in claim 16 wherein when the processor obtains, the program causes the processor to command release of neutrons into a formation surrounding a borehole.

18. The computer-readable storage media as defined in claim 16 wherein when the processor determines, the program causes the processor to determine elemental concentrations of naturally radioactive materials present in the formation and elemental concentrations of radiation activated material present in the formation treatment material.

19. The computer-readable storage media as defined in claim 18 wherein when the processor calculates the axial extent of the formation treatment material, the program causes the processor to calculate the axial extent of the formation treatment material based on the elemental concentrations of the radiation activated material present in the formation treatment material.

20. The computer-readable storage media as defined in claim 16 wherein the formation treatment material is at least one selected from the group consisting of: a proppant; a fracing fluid; and an acidizing fluid.

21. The computer-readable storage media as defined in claim 16 wherein the processor commands, compares, and calculates at plurality of depths within the borehole.

22. The computer-readable storage media as defined in claim 16 wherein the processor compares and calculates at surface.

23. A system comprising:
a neutron source that releases neutrons in a formation;
a first gamma detector spaced a first distance from the neutron source;
a second gamma detector spaced a second distance from the neutron source, the second distance greater than the first distance;
the first gamma detector and the second gamma detector sense energies of gammas produced by materials in the formation;
a processor electrically coupled to the first gamma detector and the second gamma detector, wherein the processor:
analyzes a measured spectrum of the energies of the gammas sensed by the second gamma detector with a first basis spectrum; and
determines elemental concentrations of the materials in the formation.

24. The system as defined in claim 23 wherein the elemental concentrations of materials in the formation comprises elemental concentrations of naturally radioactive materials present in the formation.

25. The system as defined in claim 24 wherein the processor analyzes a measured spectrum of the energies of the gamma sensed by the first gamma detector with a second basis spectrum to determine elemental concentrations of radiation activated material in a formation treatment material.

26. The system as defined in claim 25 wherein the processor determines the axial extent of the formation treatment material in the formation based on the elemental concentration of the radiation activated material present in the formation treatment material.

* * * * *